US006810527B1

(12) United States Patent
Conrad et al.

(10) Patent No.: US 6,810,527 B1
(45) Date of Patent: Oct. 26, 2004

(54) SYSTEM AND METHOD FOR DISTRIBUTION AND DELIVERY OF MEDIA CONTEXT AND OTHER DATA TO AIRCRAFT PASSENGERS

(75) Inventors: Adam P. Conrad, Los Angeles, CA (US); John L. Norin, Hawthorne, CA (US); Rômulo Pontual, Pacific Palisades, CA (US); Peter W. Smith, Los Angeles, CA (US); Jeffrey M. Wales, Beverly Hills, CA (US)

(73) Assignee: News America, Inc., New York, NY (US)

( * ) Notice: Subject to any disclaimer, the term of this patent is extended or adjusted under 35 U.S.C. 154(b) by 0 days.

(21) Appl. No.: 09/404,167

(22) Filed: Sep. 27, 1999

(51) Int. Cl.[7] .................................................. H04N 7/18

(52) U.S. Cl. .............................. 725/76; 725/74; 725/75; 725/77; 725/82; 725/83

(58) Field of Search ..................................... 725/77, 76

(56) References Cited

U.S. PATENT DOCUMENTS

| | | | |
|---|---|---|---|
| 4,303,937 A | 12/1981 | Cook .......................... 358/86 |
| 4,392,139 A | 7/1983 | Aoyama et al. ............. 343/705 |
| 4,521,021 A | * 6/1985 | Dixon .......................... 463/47 |
| 4,584,603 A | 4/1986 | Harrison ...................... 358/86 |
| 4,835,604 A | 5/1989 | Kondo et al. ................ 358/86 |
| 4,866,515 A | 9/1989 | Tagawa et al. ............... 358/86 |
| 4,887,152 A | 12/1989 | Matsuzaki et al. ............ 358/86 |
| 4,975,696 A | * 12/1990 | Salter et al. ................. 340/973 |
| 5,055,660 A | 10/1991 | Bertagna et al. ............. 235/472 |
| 5,057,677 A | 10/1991 | Bertagna et al. ............. 235/381 |
| 5,123,015 A | 6/1992 | Brady, Jr. et al. ........... 370/112 |
| 5,179,447 A | 1/1993 | Lain ........................... 358/254 |
| 5,208,590 A | * 5/1993 | Pitts ........................... 340/973 |
| 5,214,505 A | 5/1993 | Rabowsky et al. ........... 358/86 |
| 5,220,419 A | 6/1993 | Sklar et al. .................... 358/86 |
| 5,262,762 A | 11/1993 | Westover et al. ........... 345/168 |
| 5,289,272 A | * 2/1994 | Rabowsky et al. ........... 725/76 |
| 5,311,302 A | 5/1994 | Berry et al. ................... 348/14 |
| 5,374,103 A | 12/1994 | Stange et al. .......... 297/188.16 |
| 5,404,567 A | * 4/1995 | DePietro et al. ........... 455/3.06 |
| 5,421,530 A | 6/1995 | Bertagna et al. ........... 242/47.5 |
| 5,463,656 A | 10/1995 | Polivka et al. .............. 375/200 |
| 5,467,106 A | 11/1995 | Salomon ...................... 345/87 |
| 5,515,098 A | 5/1996 | Carles ............................ 348/8 |
| 5,524,272 A | * 6/1996 | Podowski et al. ............. 725/74 |
| 5,568,484 A | 10/1996 | Margis ....................... 370/85.5 |

(List continued on next page.)

FOREIGN PATENT DOCUMENTS

EP          0570198          11/1993

OTHER PUBLICATIONS

Moreyne, Marshall, Visual Communication Network—A Real Time Electronic Passenger Information and Communication System, 1995, Proceedings of the First World Congress on Applicatoinos of Transport Telematics and Intelligent Vehicle–Highway Systems, pp. 1,2.*

(List continued on next page.)

Primary Examiner—Vivek Srivastava
Assistant Examiner—Chris Nalevanko
(74) Attorney, Agent, or Firm—Sofer & Haroun, LLP

(57) ABSTRACT

An end-to-end global distribution system that can produce and deliver live content as well as pre-recorded content and other content, to commercial passenger aircraft via a satellite and ground-based infrastructure. The content can include live television, pre-recorded content, advertisements as well as other content such as software applications, internet material, etc. The delivered content can be tailored based on distribution criteria such as airline, aircraft, origin and destination, flight number, cabin class, and others. Such system can be advertiser-supported and include targeted and distribution specific advertisements. Furthermore, access to the content can be controlled by various conditional access parameters at the server level, to various aircraft zones, and at the passenger level.

79 Claims, 7 Drawing Sheets

U.S. PATENT DOCUMENTS

| | | | | |
|---|---|---|---|---|
| 5,610,822 A | | 3/1997 | Murphy | 364/449.5 |
| 5,617,331 A | | 4/1997 | Wakai et al. | 364/514 |
| 5,678,171 A | | 10/1997 | Toyama et al. | 455/3.2 |
| 5,717,878 A | * | 2/1998 | Sannino | 725/117 |
| 5,732,324 A | | 3/1998 | Rieger, III | 455/3.1 |
| 5,745,159 A | | 4/1998 | Wax et al. | 348/8 |
| 5,760,819 A | | 6/1998 | Sklar et al. | 348/8 |
| 5,760,821 A | | 6/1998 | Ellis et al. | 348/10 |
| 5,761,601 A | | 6/1998 | Nemirofsky | 455/3.1 |
| 5,790,175 A | * | 8/1998 | Sklar et al. | 725/76 |
| 5,801,751 A | * | 9/1998 | Sklar et al. | 725/76 |
| 5,808,661 A | | 9/1998 | Infiesto et al. | 348/14 |
| 5,835,127 A | * | 11/1998 | Booth et al. | 725/76 |
| 5,854,591 A | | 12/1998 | Atkinson | 340/825.17 |
| 5,896,129 A | | 4/1999 | Murphy et al. | 345/327 |
| 5,923,743 A | | 7/1999 | Sklar | 379/167 |
| 5,929,895 A | * | 7/1999 | Berry et al. | 725/77 |
| 5,953,429 A | * | 9/1999 | Wakai et al. | 381/77 |
| 5,966,442 A | * | 10/1999 | Sachdev | 380/212 |
| 5,969,668 A | | 10/1999 | Young, Jr. | 342/357 |
| 5,973,722 A | * | 10/1999 | Wakai et al. | 725/76 |
| 5,990,928 A | * | 11/1999 | Sklar et al. | 725/72 |
| 5,991,138 A | | 11/1999 | Sklar | 361/118 |
| 6,008,758 A | | 12/1999 | Campbell | 342/358 |
| 6,177,887 B1 | * | 1/2001 | Jerome | 340/5.9 |
| 6,249,913 B1 | * | 6/2001 | Galipeau et al. | 725/76 |
| 6,529,706 B1 | | 3/2003 | Mitchell | 455/12.1 |

OTHER PUBLICATIONS

ARINC Teams With Sky Media to Provide New Passenger Services dated Dec. 10, 1998.
Datron System Announces Receipt of Orders for Airborne DBS TV Products in Excess of $3 Million dated Jan. 13, 1999.
Spotlight: Boeing Plans High–Speed, In–Flight Communications Ser dated May 1, 2000.
In–Flight Entertainment Clears the Runway and Heads for the Wild Blue Yonder dated May 18, 1999.
LiveTV: At a Glance dated 1999.
The French Connection dated May 1999.
AIS–1000 Airborne Information Systems Brings Direct Broadcast Satellite (DBS) TV to Business Aviation dated 1999.
Association Broadcasts Live TV Plan dated Aug. 18, 1999.
Dyantech Corp. Dated 1998.
Dynatech Announces Several Large Orders dated Jul. 13, 1998.

* cited by examiner

US 6,810,527 B1

SYSTEM AND METHOD FOR DISTRIBUTION AND DELIVERY OF MEDIA CONTEXT AND OTHER DATA TO AIRCRAFT PASSENGERS

BACKGROUND OF THE INVENTION

1. Field of the Invention

The present invention relates generally to a system and method for distribution and delivery of media content and other data to aircraft passengers and more particularly, to an integrated end-to-end distribution system that produces and delivers live content as well as pre-recorded and other content, to commercial passenger aircraft via a satellite and ground-based infrastructure as described in the Description of the Related Art.

2. Description of the Related Art

There is a strong demand for live television content by passengers of commercial aircraft. The offering of live television to flying passengers has been disclosed in U.S. Pat. Nos. 5,790,175 and 5,760,819, the disclosures of which are herein incorporated by reference. These patents describe systems that provide live in-flight television programming to aircraft passengers that is received from direct broadcast satellites (DBS) such as those used to provide the DIRECTV service. As described in these patents, the DBS signals are distributed to passengers using the aircraft's in-seat video and audio distribution system, such as an APAX-150 distribution system made by Hughes-Avicom International. Thus, live signals as well as pre-recorded content from audio and video players may be provided to passengers via either overhead monitors or to individual inseat video monitors so that passengers can select from a number of available programs. U.S. Pat. No. 5,929,895 describes an architecture for an aircraft entertainment system that supports reception of satellite broadcasts from a DIRECTV direct broadcast satellite as well as other video programming from on-board storage devices without providing a tuner to each seat.

Although such patents disclose systems capable of delivering live television content to aircraft during flight, and providing such signals as an additional source of content for passengers, the prior art is deficient in several respects. First, lacking in the prior art is an integrated end-to-end system for providing 'live television' (wherein 'live television' in digital systems is not purely live since there is a delay in transmission between origin of signal and destination) and other data content to aircraft in accordance with various distribution criteria, such as airline, aircraft origin and destination, flight number, cabin class, and others. Second, the prior art fails to disclose an economically-viable system and method for providing an advertiser-supported distribution mechanism for live television and other data content to aircraft. Third, the prior art is not capable of providing global coverage which is seen as a necessary element for acceptance by the leading global airlines. These and other deficiencies in the prior art are addressed by the present invention, although the invention should not be construed as limited to a system and method that addresses all of the deficiencies simultaneously.

SUMMARY OF THE INVENTION

A primary aspect of the present invention is an improved system and method for distribution and delivery of media content and other data to aircraft. The improvement comprises a system that receives, aggregates, and distributes content on an addressable, targeted basis to commercial passenger aircraft via a satellite and ground-based bi-directional network. In one aspect of the invention, both live content, such as live television, and pre-recorded content is aggregated, tagged or addressed with identifying information and other access control parameters and distributed via satellite up-link and stationary wireless transmission to aircraft while either on the ground or in flight. As used herein, "live content" refers to content, such as that originating from a broadcast television signal, that is digitally encoded and transmitted with a delay typical of a broadcast digital network, which may be several minutes. A centralized facility receives the content from multiple sources. The content is digitized, packetized, multiplexed, and addressed using one or more individual or group addresses corresponding to a plurality of distribution criteria. The digitized data is transmitted to aircraft using a combination of ground-based, wired transmission infrastructure, e.g., the public-switched telephone network (PSTN) and the Internet, and wireless transmission, including wireless microwave and satellite transmission to aircraft parked at terminal gates, and satellite up-link to aircraft in-flight. Distribution of content may be based on any combination of a plurality of criteria, including aircraft number, flight number, flight phase, airline, cabin class, language, date, time of day, flight origin, flight destination, passenger demographics, and other criteria. The invention thus provides an integrated end-to-end digital broadcast network tailored for airline passenger audiences and the necessary infrastructure for an economically viable, advertiser-supported airline entertainment network with live content capability.

In another aspect of the invention, a media server system with an on-board system controller is provided that receives the transmitted content, combines it with stored (e.g., on-board) content, which may include entertainment content as well as advertising, and generates a play-out schedule for the combined content that is specific to the server. The on-board system controller generates the final channel schedule play-out on the aircraft through on-board logic that accounts for a "flight-centric" time frame (i.e. time frame that takes into consideration the local departure and arrival times at the origin and destination, respectively) and other more immediate data obtained during the flight, such as, for example, delay in take-off, change in routing, etc.

In another aspect of the invention, interception and piracy of content by unauthorized receivers is prevented by encryption, with decryption controlled using a broadcast-type conditional access subsystem. In a system and method of the invention using such conditional access, distribution of content may be controlled to an aircraft at the server level as well as at sub-server levels such as the different zones that are used in some existing in flight entertainment (IFE) systems. In another aspect of the invention, conditional access may also be used to restrict access to data feeds (wired or wireless) comprising data content other than audio or video to passengers' personal computers on board the aircraft.

In another aspect of the invention, an advertiser-supported system and method of distributing content to aircraft is disclosed wherein advertising content is multiplexed with news and entertainment content and distributed to aircraft on a targeted basis. In addition to receiving television and other content, an advertising manager sells advertising slots and receives advertisements from sponsors of the service. The advertising is similarly digitized, packetized, and multiplexed into the various content distribution feeds on an intelligent, targeted basis. Targeted advertising may be based on, e.g., aircraft destination, origination, airline, type of adjacent data content, cabin class, time of day, and other factors.

In addition to distribution of traditional media content, i.e., audio and video programming, the present invention also provides a system and method for delivery of software applications and other data to passengers' personal computers, either in-flight or at a ground-based point of distribution, such as an airline terminal. In flight connectivity is provided through a combination of the on-board media server and in-flight telephone system, using either a wired or wireless connection to the PC, and ground-based connectivity is provided via wired or wireless modem connection to media servers located in terminals and other ground-based points of distribution.

In yet another aspect of the invention, a "back channel" is used to provide two-way connectivity between aircraft and other points to which content is distributed and the broadcast network. "Back channel" is used herein to refer to a communications path back from an aircraft (or other point of access to content) to a network operations center. The back channel provides report back of on-board system operation to the network to provide for corrective action in the event of failure to receive signal, audits of content play-out, as-run reconciliation of advertisements, and other data that may be used to administer content delivery to the aircraft. The back channel also provides connectivity to the passenger either through the aircraft's entertainment system or the passenger's personal computer to permit, for example, receipt of e-mails and other messages while in flight.

In yet another aspect of the invention, a smart card is provided to passengers to use for access control to content on-board on an individual passenger basis, i.e., where certain content is made available to all passengers and other content is available only to individual passengers, such as electronic mail and other personalized content, as well as content that is provided for payment.

In yet another aspect of the invention, by the use of intelligent segmentation of material transmitted to the aircraft from the centralized facility, each aircraft is able to verify it has received the entire segment of material prior to playing it out to the aircraft audience. This allows for a seamless user experience, even when the aircraft temporarily loses the incoming satellite signal due to aircraft location, orientation, or other interruption to the satellite communications link. As a result, the amount of information transmitted can be increased because the system can tolerate a lower overall communications link availability. Other benefits of the above include seamless transition from satellite to satellite, and the ability to categorize content seamless for use at a later time in a pre-defined playout routine which may have been customized for particular aircraft.

It should be noted that different embodiments of the invention may incorporate different combinations of the foregoing aspects of the invention, and that the invention should not be construed as limited to embodiments that include all of the different aspects.

DETAILED DESCRIPTION

Figure 1:
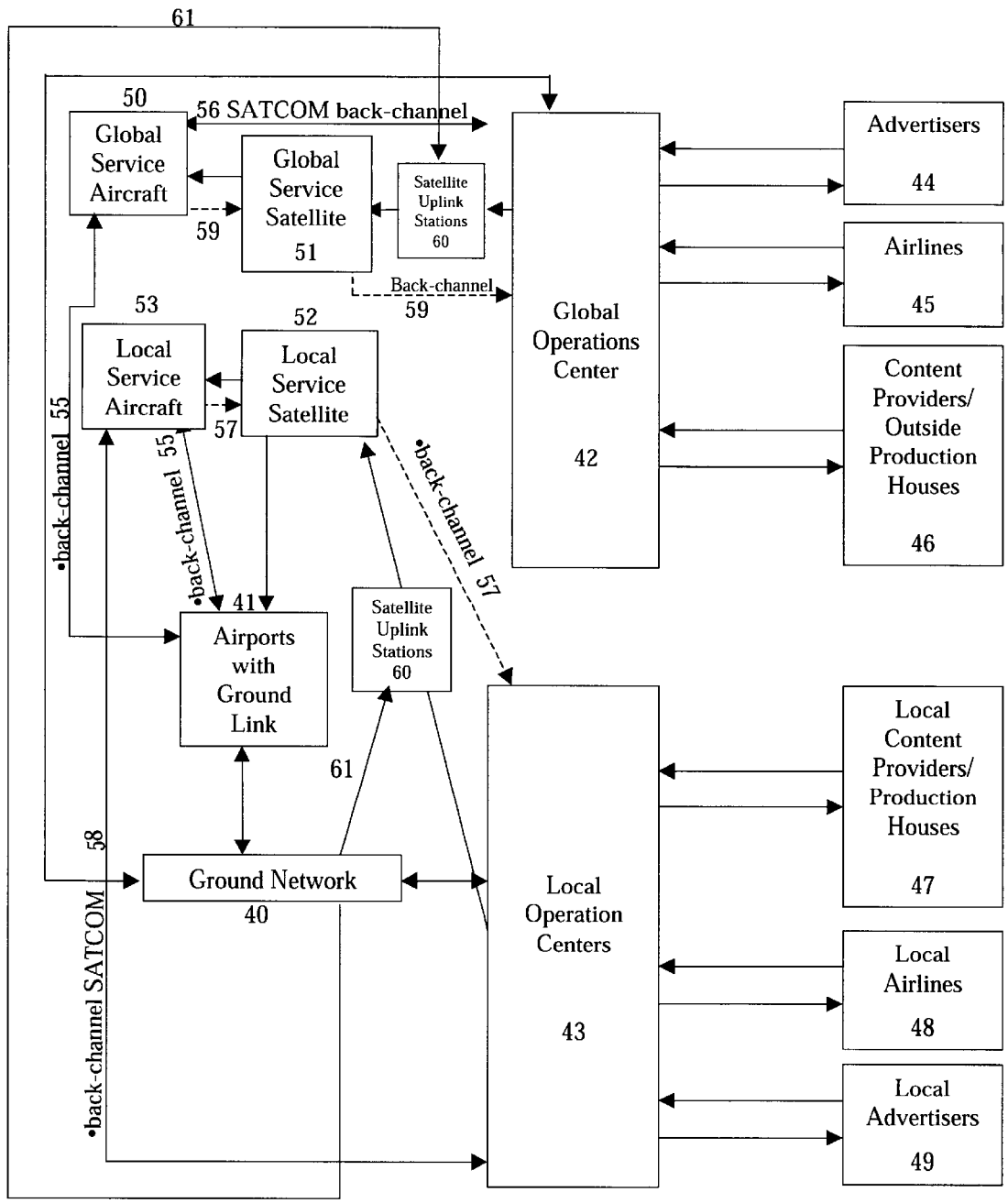
FIG. 1 is a top level block diagram of an embodiment of a distribution and delivery system in accordance with the present invention illustrating the primary elements of such a system.

Referring to the drawing figures, FIG. 1 shows the primary components of one embodiment of a content distribution and delivery system in accordance with the present invention. The system aggregates and delivers live television content and other data content to a plurality of member aircraft, operated by airlines that participate in the service. Such content can also be delivered to other types of moving vehicles in alternate embodiments of the invention. One or more content management and distribution facilities (referred to herein as operations centers) receive, aggregate, format and address content via both a ground-based and satellite communication distribution network to member aircraft and other points of distribution, e.g., airport terminals. In a preferred embodiment as illustrated in FIG. 1, the system serves aircraft flying both global (e.g., trans-oceanic) and local routes (typically flights of 1–3 hours). The system of FIG. 1 comprises a global operations center GOC (42) that delivers global live, timely content, advertisements, syndicated shows and films to the member aircraft. The GOC (42) aggregates and formats digital data feeds comprising audio, video, and data content, which are transmitted to member aircraft configured to integrate streams (i.e., content transmitted in real-time via satellite that is short-lived material, e.g. live, timely or daily content ) and elements (i.e., long-lived material that will be replayed over a period of days such as advertisements, syndicated shows and films) of data for play-out. Content delivered to a given member aircraft may be based on a number of distribution and access control criteria such as airline, aircraft, flight origin, flight phase, time, date, passenger demographics, tail number and flight destination that are determined through exchanges of requests and reports between airlines (45) and the GOC (42). The various elements form an integrated, end-to-end, digital broadcast distribution network that delivers content to aircraft (50 & 53) and also receives status reports from aircraft in order to manage the system, and provide payment and reconciliation to content providers (46) and advertisers (44). The elements of the system are described in greater detail below. The invention draws upon existing digital broadcast technology, including in some embodiments, conditional access, as well as known technology for satellite delivery of television signals to aircraft, in a novel manner that provides for an economically-viable, bi-directional and advertiser-supported broadcast network.

The GOC (42) interconnects with regionally located local operations centers LOC (43) to deliver content tailored to airlines (45) that subscribe to the service. The global ground network (40) compresses and delivers content between the global operations center (42) and the local operations centers (43) which in turn deliver content to the local or global aircraft (50 or 53) depending on the route of the flight and the type of content that is to be distributed. The GOC (42) and LOCs (43) perform similar functions, the difference being that the former processes primarily content of global interest while the latter process primarily content of regional interest. The local operations centers (43) function like the GOC (42) but, operate in local regions and produce and deliver local live and timely content to the local aircraft (53), but generally not syndicated shows and feature films. For example, LOCs (43) may be connected to local advertisers (49). In general, the local operations centers (43) service short-haul flights less than 3 hours in duration. For example, local operations centers may be provided for each of North America, South America, Europe and Japan.

Content is transmitted to aircraft (50 & 53) in two ways, via satellite up-links (60) to aircraft (located both locally and/or globally), referred to herein as "real time" data, and via ground based wireless links (41) to stationary aircraft parked at terminal gates. Satellite up-links (60) to member aircraft may be Ku-band, C-band, or both (depending on aircraft routes). In addition, for certain applications, Ka-band satellites may be used. Multiple up-links (60) throughout the world are used to provide global coverage for the service. The real time data may be received by the aircraft (50 & 53) while on the ground or airborne during flight. Although primarily used for reception of live content, the real time data feed may also include timely content, i.e., content that is not live but has only a short life span such as news, pre-recorded, and advertising content. The satellite up-link facilities (60) may or may not be co-located with the operations centers (42 & 43). In a preferred embodiment, in order to minimize capital outlays, existing up-link facilities (60) and satellite transponder capacity are utilized. The ground-based wireless link (41) may be a microwave link, such as the Gatelink system available from Rockwell Collins, Inc. This will typically provide a higher bandwidth path to the aircraft than the satellite up-link and is useful for transferring pre-recorded content to aircraft, such as television programming and feature films.

Figure 2:
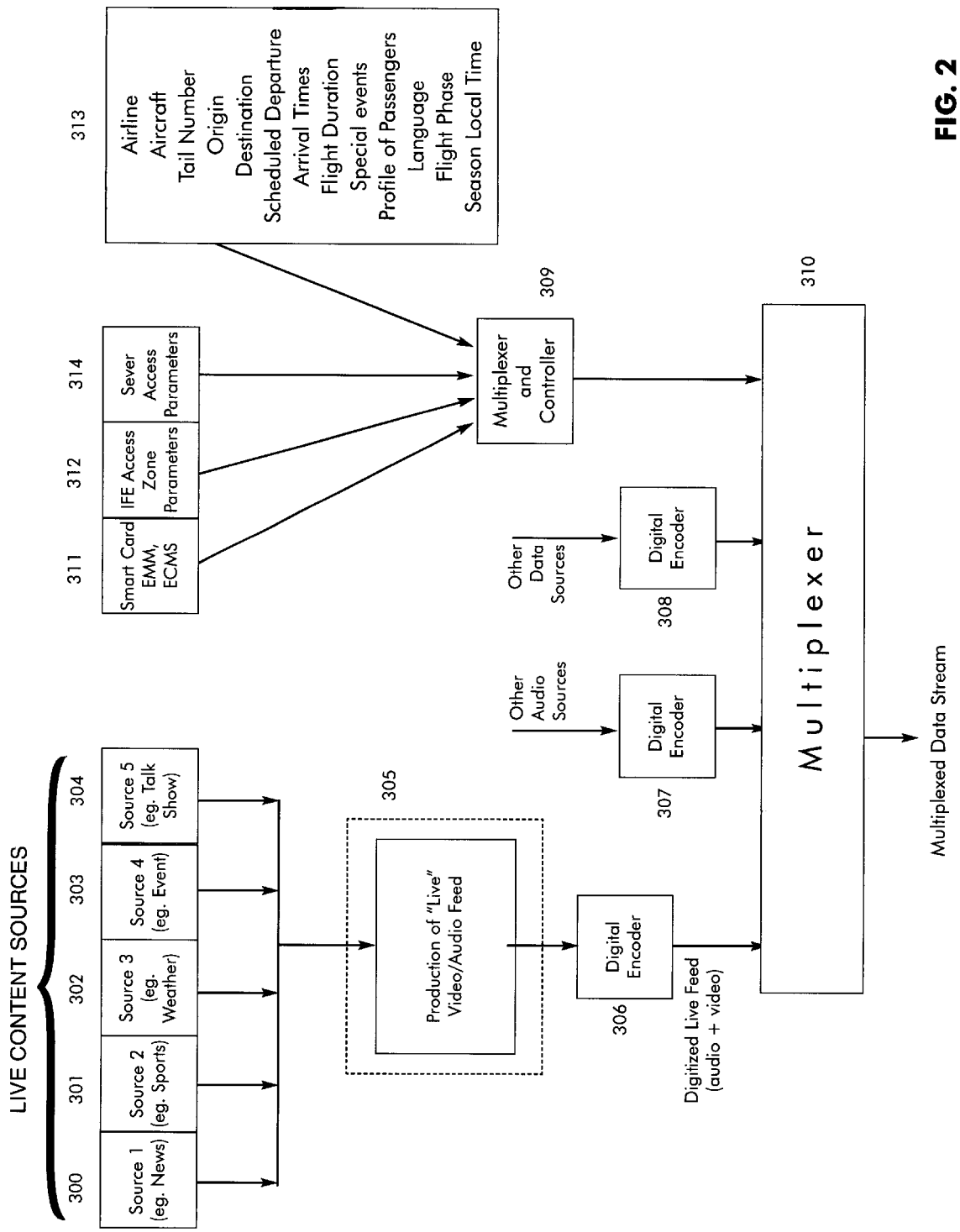
FIG. 2 illustrates the functions performed by the global operations center of the system of FIG. 1

FIG. 2 provides an example of the functions performed by the global operations center in producing specific tailored content (313) that may also include server access parameters (314), IFE access zone parameters (312) and conditional access control parameters (311) through the satellite data stream composition and subsequent transmission of such tailored content and various access control parameters to member aircraft. The production function involves taking specific live content from incoming sources such as for example, news content (300), sports (301), weather (302), events (303), or talk shows (304). A specific mix for each satellite feed is created for the aircraft served by the feed, based on such criteria (313) as airline, aircraft, aircraft tail number, location (origin or destination), scheduled departure, arrival times, flight duration, special events, cultural profile or demographics of passengers, flight phase, cabin class, season and/or day local time of day. The production process (305) may occur either at global operations (42), satellite up-link facilities (60) or at existing production houses (46 or 47). Also, the production process may also create imbedded break points that are used to segmentize the content in order to allow the on-board equipment to verify integrity of content before playing the live feed to passengers. Prior to playing out, the on-board equipment, such as multiplexer (310) may verify that all requests for a portion of content have been properly received. This will eliminate undesirable outages by allowing locally stored content on the aircraft to be intelligently inserted during the satellite feed outage. The production facilities (305) transmit segmented live feeds of audio and video as well as other audio and data services to digital encoders (306–308). Various control information such as access control data (311), IFE zone access parameters (312) and server access parameters (314) may also be transmitted from a multiplexer/controller unit (309) and embedded in the resulting data stream to control access to content at the server level, various zones of the plane or even individual access by the passenger(s).

As shown in FIG. 1, the GOC (42) may transform audio and video signals into MPEG compressed data elements and delivers the elements based on scheduled dates in play-lists generated by GOC (42). Through incorporation of satellite communication from the aircraft (50 & 53) to the GOC (42) while in flight (e.g., using the on-board satellite telephone system), the GOC (42) is capable of storing and forwarding elements to aircraft (50 & 53) on request or when required, even seconds before broadcast. The GOC (42) implements both unidirectional and bi-directional technologies in order to maximize transmission capacity, speed and data delivery. The aircraft (50 & 53) are equipped with server-based processing equipment to receive, decrypt, store and play streams and elements, as described in greater detail below.

The GOC (42) interfaces with advertisers (44), airlines (45), outside production houses and content providers (46) in order to support the configuration management and distribution processes used to format and transmit the digitized data feeds in accordance with playout schedules that dictate how both live and stored content is multiplexed and sequenced for transmission. Playout schedules are generated based on member aircraft requests, the database of content available from the various content providers, advertising constraints, various editorial rules and other criteria discussed below that serve to maximize the value of the service provided to passengers and advertisers. In one embodiment, the GOC (42) also creates playout schedules for the member aircraft and provides such schedules to the aircraft to control on-board playout of content. Alternatively, on-board playout schedules may be generated in part (i.e. through modification of schedules provided by an operations center) or solely by the on-board equipment.

In embodiments of the invention where advertising is included in the content provided to passengers, the global operations center (42) may also serve as an advertising manager to sell ad slots in the content that is ultimately played out on the member aircraft. For example, the advertisers (44) provide payments for ads, reservations for ad slots, and various ad content that is to be incorporated into data elements for the aircraft systems (50 & 53). The GOC (42) requests of advertisers available ad slots, provides reconciliation reports of data as-run and bills advertisers for airtime. The global operations center (42) configures, develops and maintains the advertisement schedules and upon completion of such schedules, they are passed to the system for program material reconciliation with advertisers and for distribution to appropriate up-link facilities (60) for delivery of feeds to local and global satellite up-links (51 & 52) located regionally throughout the world.

Airlines (45) and (48) that participate in the service provide information to the operations center (42) & (43) used to insure that the data feeds include the necessary content to meet the requirements of the specific member as best as can be done within the operational constraints of the specific system and the available content. Such information may include channel sequence preference lists, promotional content, fleet information, any airline-specific editorial rules, audio program content and are in turn provided with ad revenue, current listings and availability of programs to assist in making their selections. The GOC (42) uses this information to develop and identify television material for inclusion in stream schedules which define the required delivery date and time for program material. Each stream schedule television program entry is tagged with identifying information program segment name, program segment type, position of segment, primary language, secondary languages, required delivery date, required delivery time and length of segment. This information forms part of the distribution and access control information that is used by on-board system controllers to determine the disposition of the received content on board a given aircraft, as is described below. Alternate material is identified when scheduled live or timely content is unavailable. If alternate material is in fact identified, each entry will include program segment name, alternate for, position of segment, primary language, secondary languages, required delivery date, required delivery time and length of segment. Updates to the stream schedules are made as program material is added or replaced.

The Global Operations Center (42) may interface with each airline (45) to determine which programs from appropriate stream schedules will be broadcast on their aircraft and the respective times. Based on the airline's preferences, the Global Operations Center (42) configures and enables the development of channel schedules for every route the airline flies based on criteria such as location (origin or destination), aircraft tail number, cultural profile of passengers, flight phase, cabin class, language, season and/or local time of day. In one embodiment of the invention, pre-defined channel schedules are developed by the Global Operations Center (42) and/or the Local Operations Centers (43) and delivered to each aircraft individually or to a group of aircraft, such as aircraft from the same airline, aircraft carrying passengers to the same special event or grouping such as nationality, language, convention, profession, religion, musicians, models etc.

Channel schedules define the broadcast time of a program segment relative to the aircraft's "flight-centric time frame". Channel schedules will typically include a certain number of advertisements per hour inserted into slots in the program schedules. In addition to establishing the final playout schedule, each aircraft may individually tailor its channel schedule by selecting the specific advertisement inserted in each slot based on criteria designed to maximize impact on the passenger audience. GOC (42) interfaces with airlines (45) to sell airtime including sales transactions through the internet. Searches for ad slots are based on categories such as: airline, region, location (origin or destination), aircraft tail number, flight phase, event, program type, local time (origin or destination) and/or cabin class. The GOC (42) may also interface directly with advertisers(44) to sell global and local advertisement slots and may also maintain a database of each advertiser's preferences and relative priority of each advertisers' preferences including destination or flight phase. GOC (42) may also provide as-run data log files and reconciliation reports to each advertiser (44).

Certain aircraft, e.g., larger aircraft serving trans-oceanic routes, may be outfitted with sufficient storage and processing capabilities to provide multiple channels of content grouped by subject matter.

The GOC (42) enters, validates, updates, reviews and submits new channel and advertisement schedule data as airlines change their preferences and transmits new content to the satellite up-link stations (60). Satellite up-link stations (60) may also be configured to alter channel and/or advertisement schedules based on various incoming data. After new channel schedules are developed, a corresponding advertisement schedule is developed and delivered to advertisers (44) for material reconciliation and subsequent distribution to satellite up-link stations (60) for transmission to aircraft. Another function that may be implemented in the GOC (42) is real-time monitoring of the entire network for trouble-shooting and diagnostic purposes.

Each aircraft (50 & 53) is individually addressable by GOC (42) and LOC (43) thus, allowing for delivery of audience-based content on an aircraft-specific basis or on request if desired. Such aircraft (50 & 53) are equipped with on-board digital content servers and controllers that essentially transform each aircraft into the equivalent of a local cable interconnect that is able to correctly receive, disassemble, order, schedule and present in a synchronized fashion both real-time and stored content including digitally distributed theatrical film product.

The GOC (42) is the main clearinghouse for international media receiving global content from global and local content providers (47) and outside production houses(46). It delivers films, syndicated shows and other content intended for longer haul flights (e.g. transcontinental) and also provides content to the LOC (43) which in turn input and add appropriate local media and deliver that data to local fleets of aircraft (53) assigned to that region. An international network (utilizing the Internet, PSTN, and other available transmission resources) interconnects the GOC (42), the LOC (43) and the member aircraft (50) & (53). Based on various criteria, including customer feedback, demographics, and airline requirements, content is elected for each region which is classified and delivered in digitized packets as either stream content (i.e. live, timely or daily show) or element content (i.e. film or short subject). Content may be MPEG compressed TV and audio content which may be encoded using either MPEG-1 or MPEG-2. Audio may be encoded per MPEG-a, Layer II. Regional schedules for stream and element content are created and delivered to local aircraft (52).

The data feeds that are ultimately transmitted and received by member aircraft (50 & 53) and authorized terminal distribution points thus comprise both streams and elements of widely-varying content and advertisements with each stream and element identified or tagged in accordance with one or more distribution criteria. The data feeds may or may not comprise contiguous, live television feeds. In general, live content in the form of streams is multiplexed with pre-recorded content and other data.

The global service aircraft (50) and local service aircraft (53) are equipped to integrate and multiplex streams of data (i.e., transmitted in real-time via satellite and is short-lived material such as live, timely or daily content) as well as elements of data that are already stored on-board (i.e. long-lived material that will be replayed over a period of days such as advertisements, syndicated shows and films). Such streams and elements of content are based on distribution and access criteria such as class of service, flight phase, time, date, tail number and destination of flight that were provided initially by airlines (45).

Figure 3:
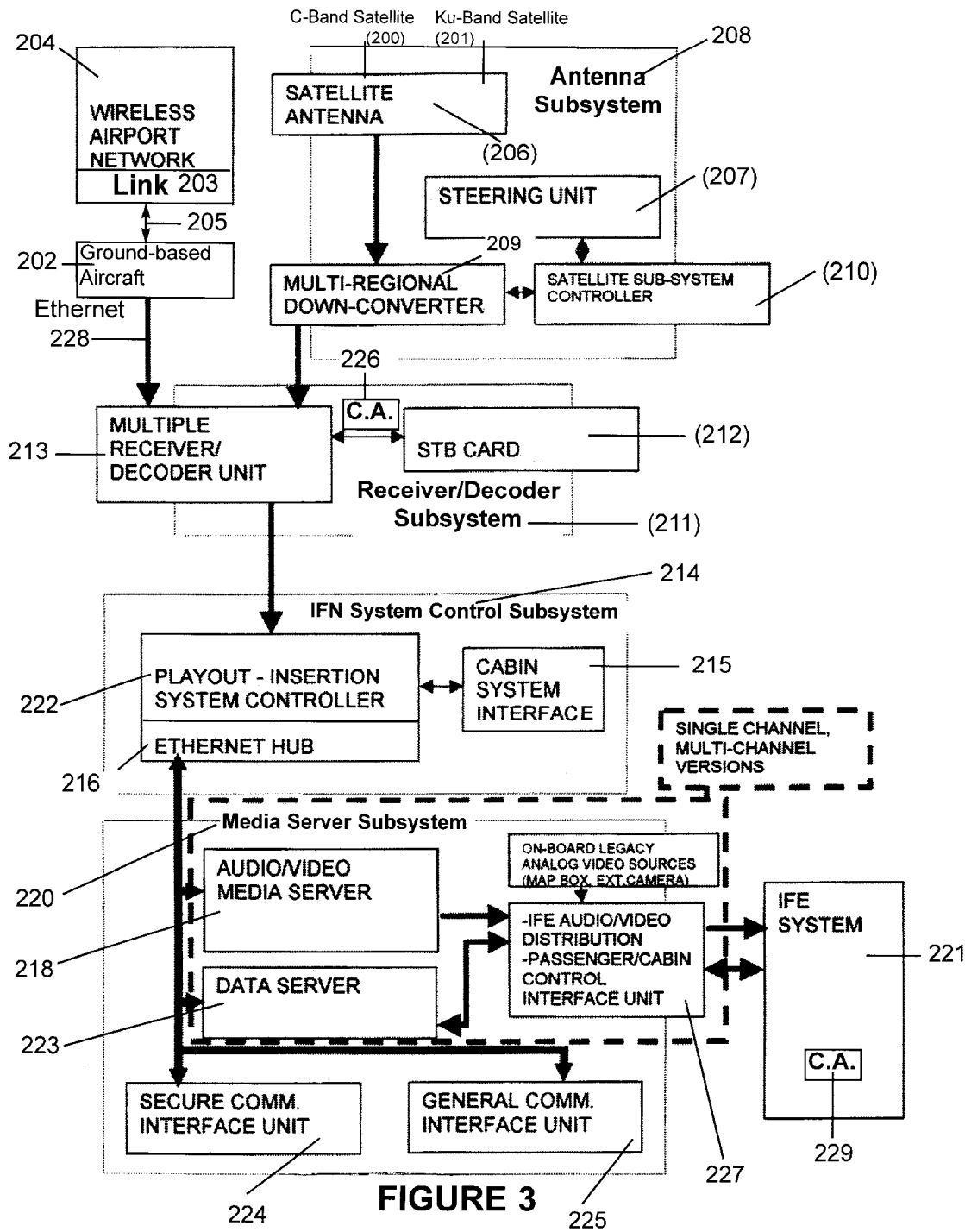
FIG. 3 is a system-level diagram detailing one embodiment of the system architecture for the on-board components of the system of FIG. 1.

FIG. 3 is a system-level block diagram of the primary components for one implementation of the on-board hardware for an aircraft configured to use either C-band (200) or Ku-band (201) satellite transmissions. The system uses Turbo Code, FEC (Forward Error Correction) and QPSK (Quadra-phase Phase Shift Keying) modulation. The antenna subsystem (208) receives position data necessary to receive satellite transmissions such as GPS (Global Positioning System) and aircraft orientation. The antenna subsystem (208) comprises a satellite antenna (206), which sends data to down-converter (209) which interfaces with a satellite subsystem controller (210) and in turn with a steering unit (207) to control orientation of the antenna. The antenna subsystem (208) through the on-board satellite antenna (206) interfaces with and receives data from the desired satellite, Ku-band (201) (i.e. regional coverage) or C-Band (200) (i.e. regional or global coverage) satellites or both and may have the ability to switch between the two types of satellites or feed directly from one depending on the regional coverage of the flight and how the system is configured to respond. For example, in order to provide seamless coverage, the system may be configured to receive live feeds from C-band (200) and alternatively, when out-of-range, from Ku-band (201) satellites to support non-interrupted viewing. The system may also be configured to repeatedly switch between both C-band (200) and Ku-band (201) when out of range with one or the other. Aircraft-based antenna systems for receiving satellite transmitted digital signals are known. An example of such a system is described in U.S. Pat. No. 5,790,175, titled "Aircraft Satellite Television System for Distributing Television Programming Derived from Direct Broadcast Satellites", the disclosure of which is herein incorporated by reference.

In the event that reception is not possible from either satellite, pre-recorded content is played out to provide seamless viewing to passengers. Should reception not be available due to unforeseen circumstances prior to take-off such as diversions in routes, severe weather conditions, and malfunction of equipment, the on-board controller (222), in communication with a cabin system interface (215), is equipped to switch to pre-recorded content when reception is interrupted or a program segment cannot be viewed in full without interruption because of a change in the controlled environment of the plane such as for example, an earlier than scheduled landing due to aircraft equipment malfunctioning. The data feeds are usually live or timely video but can also be stored video/audio, internet or application software, e-mails, data or other media. The data streams that are received by the antenna subsystem (208) are decoded by the on-board multiple receiver/decoder unit (213). The data may be received in MPEG form. The receiver (213) transmits the data to an on-board digital based media server (220) in a compressed or decompressed and decoded form.

The on-board system may also receive data from a wireless airport network (204) that is ground-based and provides content elements and data on-board prior to departure via a link (203). In addition to providing content in-flight, an Ethernet port (228) interfaces with the ground-based airport network link (203) for wireless transmission of pre-recorded content, for example, while an aircraft is parked at the airport gate (202), through a high speed, cost effective information path between the aircraft and ground. The wireless link (203) system is bi-directional and provides a higher bandwidth path for loading stored content to the aircraft than the satellite receivers. The bandwidth of the ground link (203) may be up to 10 Mb/s or greater. Local satellite up-links (60) provide live feeds to the ground-based airport network (204). The wireless airport network link (203) comprises a wireless interface which connects to a communication unit and allows for bi-directional communications via a back-channel (205). The wireless airport network link (203) permits the on-board system to communicate with the wireless airport network (204) as well. Two-way communication to other elements of the system can be accomplished by a combination of the internet, intranets (international and national), PSTNs (public-switched telephone networks) and other communications paths. In some embodiments where large amounts of element data must be provided to aircraft (e.g., for long trans-oceanic flights with limited access to real-time data), it may be desirable to transmit content to aircraft through the satellite up-link system while the aircraft is stationary (202) at a terminal gate.

Those of ordinary skill in the art will appreciate that various communication protocols for data transfer may be used such as TCP/IP (Transmission Control Protocol/ Internet Protocol) protocols (TCP, FTP and UDP). The specific protocols chosen will depend upon the design requirements for a given system. For example, a TCP/IP interface to the aircraft may be implemented, but such a protocol is intermittent in nature depending upon the activity of the ground link (203) to the aircraft (202). An on-board Ethernet (216) hub allows for TCP/IP off-aircraft ground link (203) transmission of content and storage of such content on-board the media server subsystem (220). The satellite network will have unused bandwidth during commercial breaks on board. Therefore, the time may be used for the delivery of elements. The system may store and forward element content while stationed at the ground link (203) and while at the gate. In addition, when stationed at a gate, an aircraft can request elements missed during satellite transmission. This is accomplished through a back-channel (205) which allows the aircraft to send to the network various communications such as failure reports, as-run reconciliation reports, audits of play-outs for advertisers, traffic information, problems with advertisements, payment to content providers etc. Should failures in receipt of signals occur, corrective action can be taken. Furthermore, if any delays, weather conditions, traffic or other situations arise during flight, upon receipt of such information, the server (220) will act to respond to those variables which may alter play-out schedules. The back-channel (205) may also be provided in-flight through, e.g., the on-board media server (220) and airborne telephone system existing on the aircraft.

As is apparent, large amounts of data may be transferred electronically between the aircraft and ground. In order to meet the data transfer requirements for a given system, simultaneous use of several co-located channels may be implemented to increase the system throughput. The ground portion of the wireless link (203) can serve multiple aircraft sharing the same channel, each having a portion of the data link capacity. For further capacity, the aircraft can simultaneously receive from multiple wireless links (203).

The audio/video media server (218) sends stored content to the passenger and/or cabin control interface unit (227) for distribution of content to the In-flight Entertainment System (221) according to channel schedules. The wireless link subsystem (203) interfaces with the system control subsystem (214) through an Ethernet hub (216) which sends content to the media server subsystem (220) media file server (218). Commercial-off-the-shelf peripheral network devices can safely interface with the aircraft avionic systems through a secure communications link (224) in FIG. 3.

The receiver/decoder subsystem (211) comprises a receiver/decoder unit (213) that may also be connected to STB (set-top box) cards (212) to allow individual passenger-controlled access to content. This subsystem (211) receives an L-band down-converted stream from the antenna subsystem (208). After data has been down-converted and received, the receiver/decoder subsystem (211) allows control with respect to down-converted streams in at least three aspects: a) server-based conditional access which secures content only to member aircraft by transmitting and decoding entitlement control messages imbedded in the data feeds; b) controlling content that is distributed through the data feeds according to business rules that define and control play-out schedules in accordance with such factors as aircraft type, airline type, flight number, aircraft altitude, location, cabin class, and destination as well as more immediate flight-specific factors that may affect scheduling of play-outs such as traffic information, delays, weather conditions, unique passenger groupings, conventions, sports teams, performers, etc.; c) additional control of access and distribution to content may be extended to various zones in the plane, for e.g. first class, business class, coach zones.

The decrypted output data stream is sent to the system control subsystem (214) for routing and/or storage of content. The system control subsystem (214) routes incoming data from the wireless airport network (204) and satellite(s) (200 and/or 201) as discussed above. The system control subsystem (214) also has a playout—insertion system controller (222) that controls the logical sequencing of stored and live content and may include a user interface (215) for the cabin crew. The controller (222) provides centralized management and control of the System (214) as well as comprehensive real-time management of the large amount of digital media handled by the System (214) on a second by second basis. The controller (222) may perform certain management tasks such as routing of incoming media to the proper server location (218 or 223), maintaining the ad insertion database for all possible city pair flight segments (i.e. origin and destination airport codes), media program playback timing for each individual flight, and communicating system as well as media inventory status to the operations centers on the ground (i.e. global operations center (42) and local operations centers (43)). The controller (222) provides the airline with an unprecedented ability to implement a wide range of service enhancing and cost reducing initiatives. The controller (222) transforms the aircraft into the equivalent of a local cable interconnect to provide a flight-specific play-out schedule of the available content in the media server subsystem (220).

The controller (222) also automatically routes incoming digital media and database files from the satellite receiver (MRDU) (213) and/or wireless airport network (204) to their proper storage location on the Media File Server (218). Media routing is accomplished through an Ethernet link (228) wherein the controller (222) acts as the hub (216). Controller (222) transfers media files from any of the digital media sources on the aircraft to any other media server having an Ethernet port through its internal Ethernet hub.

The media server subsystem (220) receives a variety of forms of tailored content from the satellites (200 & 201) and the wireless airport network (204) and produces one or more streams of audio and video programming to the In-flight Entertainment (IFE) Interface Unit (227) for playout through the aircraft's existing IFE system (221). The media server subsystem (220) is capable of storing a significant quantity of video and audio content and dynamically combining both the stored and live content under automated control. The media server subsystem (220) may also provide a network connection to the IFE system (221) that is Internet-enabled and may support HTTP, HTML, and Java Script applications.

When the aircraft is out of band with satellite coverage, more likely over the ocean, polar regions and areas of sparse population, the aircraft is out of the coverage zone of the satellites thus, content stored in the aircraft's on-board media server subsystem (220) can therein be utilized. Progression from one satellite coverage area to another with aircraft contained content allows for uninterrupted viewing by passengers. The media server system (218) stores, caches, re-assembles and distributes content on-board to passengers to provide seamless playback of content. Similarly, should the aircraft lose the satellite signal due to rain, aircraft altitude or loss of satellite up-link signal, a well-controlled uninterrupted experience will be provided by inserting segment break points in the live signal which may vary from 15 seconds to 2 minutes. Content can be cached on the aircraft to ensure the entire segment is received before play-out to the passengers occurs. If the segment is not received in its entirety, local content can be inserted in a seamless manner, returning to the live feed with the next valid content segment.

The various inputs and data taken into account in forming channel schedules on board include confirming receipt or non-receipt of various content, navigational data such as time of take-off, delays in take-off, length of flight, various time zones the plane is scheduled to encounter as travel progresses (which can affect live viewing), weather conditions, potential delays in landing, overall flight time that has unexpectedly varied (considering factors as delays, maintenance, weather, cancellations, diversions from initial flight routes or other factors that may increase or decrease expected overall flight time). Each of these factors may influence how the media server (220) controls play-out of channel schedules. Data server (223) is used for storage of Intranet-type content, such as applications programs, e-mails, and other data that is not audio or video content.

As discussed, content stored in the media server subsystem (220) is based on the distribution and access control criteria such as airline ID, aircraft type, tail number, origin, destination, scheduled departure and arrival times, flight duration, cabin classes, special events, access to content at various IFE zones of the aircraft, special events, profile of passengers and/or language.

The system will have unused bandwidth during commercial breaks on board which may be used to efficiently deliver content elements. The system may store and forward element content while stationed at the ground-based airport network (204) and during that time, will request elements missed during satellite transmission. The local and global service aircraft (50 & 53) as shown in FIG. 1, are equipped with on-board comprising logic that allows the aircraft to receive the various transmitted content from either the local or global satellite up-link stations (60) or the ground-based link (41), combines such packetized streams and elements of data, multiplexes such content with stored on-board content and uses such specialized logic to generate play-out schedules for the combined content. The transmission of content to the satellite up-link stations (60) may be directly from the ground network (40) to the up-link stations (60) through connection(s) (61a and 61b) or through the operations centers (42&43) and subsequently to the up-link stations (60). Such play-out schedules are based on channel schedules provided by the operations centers (42 and 43) and finalized based on many factors discussed above such as navigational data, i.e. time of take-off, delays in take-off, length of flight, various time zones the plane is scheduled to encounter as travel progresses (which can affect live viewing), weather conditions, potential delays in landing, overall flight time that has unexpectedly varied (considering factors as delays, maintenance, weather, diversions from initial flight routes or other factors that may increase or decrease expected overall flight time). Such navigational data may be read through the on-board secure interface unit (224).

The controller (222) formulates play-out schedules from content that already has been delivered to meet criteria such as aircraft number, flight number, flight phase, airline, cabin class, language, date, time of day, flight origin, flight destination, passenger demographics and other criteria. The controller (222) tailors the content based on more immediate flight-specific factors such as delays, re-routings, and other eventualities.

In addition, such information is provided to the operations centers through a series of back-channels. Back channel (55a) connects global aircraft (50) to ground link (41), back channel (55b) connects local aircraft (53) to ground link 41), back channel 57a connects local aircraft (53) to local service satellite (52), back channel (57b) connects local service satellite (52) to LOC (43), back channel (59a) connects global aircraft (50) to global service satellite (51), back channel (59b) connects global service satellite (51) to GOC (42), back channel (61a) and back channel (61b) connects ground network (40) to satellite up-link stations (60).

These back channels (55a, 55b, 57a, 57b, 59a, 59b, 61a, 61b) which imparts two-way communication between the aircraft (50 & 53) and the ground network (40). The on-board playout controller (222) permits the creation of aircraft-specific "channels" tailored by the aircraft's server to maximize the value to passengers and the advertisers and allow for play-out of schedules providing seamless viewing to passengers tailored to their flight conditions and distribution criteria. The system also permits immediate solutions to varied flight conditions that may affect pre-scheduled play-outs. The back-channel (55a, 55b 56, 57a, 57b, 58, 59a& 59b) permits report back of on-board system operation to the operations centers to provide for corrective action in the event of failure to receive signals, current traffic information, audits of content play-out, as-run reconciliation of advertisements and other data that may be used in configuring present and/or future play-out schedules. Such two-way interface for navigational communications may also be accomplished via the general communication interface unit (225). Ground-based back-channel (55) connectivity from the aircraft may be achieved through the wireless transmission link at terminal gates or through other means known in the art. In-flight back-channel (56, 57a, 57b, 58, 59aor 59b) connectivity can be achieved through a combination of on-board media server communications to satellite up-links stations (57a, 57b, 59a & 59b) (i.e. note that the dotted lines are meant to show that multiple global or local service satellites may be utilized depending on the aircraft's location) or directly to global or local operation centers (56 or 58) through existing on-board telephone system.

The system and method of the present invention may also include a conditional access system, such as a smart-card based conditional access system (229) that secures access to all the content delivered to subscribers of the network and/or passengers of member aircraft. Smart-card based conditional access systems for digital broadcast networks are known in the art and available from, for example, NDS Ltd., a U.K. based company. Such systems prevent interception and piracy of content by implementing, for example, DES encryption of the digitized packet data. Distribution of content may be controlled to an entire aircraft at the server level and to various zones in the aircraft (e.g., first, business, and coach classes of service). In one embodiment of the invention, passenger access to other types of data such as application software, e-mail, and other data available only for payment, may be controlled on an individual passenger basis (229). For example, passengers may be provided with individual smart cards that not only provide access to such data but also may contain the passenger's electronic ticket, flight itinerary, and other personal information. Passengers may access such data on-board through either a wired or wireless link to the aircraft's media server system (220).

As used in the context of the present invention, "conditional access" may be thought of not just in terms of encrypting data to prevent theft, but also in terms of the various other distribution and access control criteria that effectively define business rules that dictate the content actually played out to passengers.

Conditional Access systems for controlling access to broadcast content are well-known in the art. For example, *Contemporary Cryptology The Science of Information Integrity* by G. J. Simmons pp. 592–592 (© 1992, IEEE Press), incorporated herein by reference, describes how a smart-card based conditional access system may be implemented in a broadcast system for managing rights of a smart card user vis-a-vis a service broadcaster. In connection with the system and method of the present invention, conditional access may be used to permit only member aircraft and other authorized points of distribution to access content and also to apply various other control and distribution criteria to implement certain business rules that define the ultimate aircraft channel schedules. Decryption will typically be performed on the entire received data stream (or at least the components that are encrypted) using, for example, aircraft-specific smart cards An exemplary embodiment of a smart-card based conditional access system operates as follows. The smart cards store access rights or entitlements provided by the card issuer, which in this case may be the GOC (42). The member aircraft is equipped with on-board servers comprising receivers (213) having a conditional access subsystem (226) that receive the tailored content consisting of segments that have encrypted components and access control parameters. Cryptograms of control words are multiplexed in the data feeds with the encrypted packets. The control words serve as inputs to the encryption algorithm, which may be a variant of the DES algorithm. In one implementation of such a system, on-board smart cards decrypt entitlement control messages (ECMs) multiplexed with the data feeds that include a cryptogram of a control word so that the encrypted content can be properly decrypted. In order to ensure that only authorized subscribers can properly process the ECMs, Entitlement Management Messages ('EMMs') are produced by the operations centers (42 & 43) and distributed to authorized member aircraft that include a management cryptogram. Two levels of security devices are thus produced: (a) management security devices used by the smart card issuer for managing keys and rights; and (b) control security devices used by the service broadcaster for controlling access rights by the member aircraft. This conditional access subsystem (226) assures that the programming stream can not be utilized by unauthorized parties. These same principles may be applied to utilize conditional access not just to control decryption but to implement the various distribution and access control criteria that dictate the ultimate channel schedules.

Figure 4:
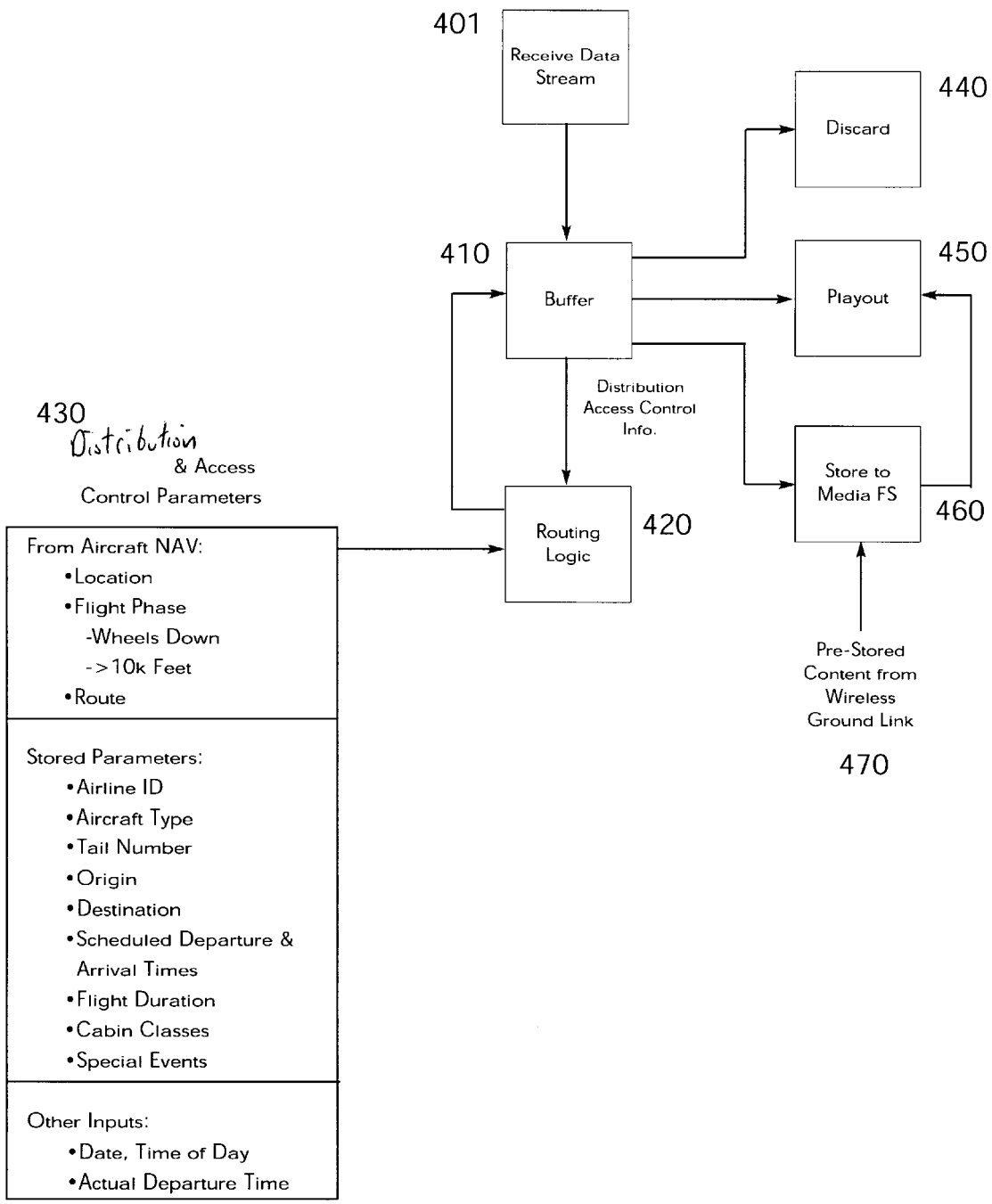
FIG. 4 illustrates one embodiment of the process by which information received in flight may be processed in accordance with the present invention.

The various content distribution criteria assigned to the packets within the data feeds allow each individual aircraft, though its playout-insertion system controller (222), to form a content play-out schedule substantially in real time. Certain received content will be discarded without being stored or played in real-time. FIG. 4 illustrates an exemplary method by which content received on-board during flight may be processed. Content received at (401) (already decrypted) is buffered at (410) where the identifying distribution and access control information in the packet headers is read and provided to routing logic which may be in the on-board controller (222). Using the various access control and distribution parameters as shown at (430), the received content is either discarded at (440), played out to the IFE at (450), or stored to the media file server at (460). In addition, as shown in FIG. 4, the content played out from the file server will include pre-stored content (470) that was transferred while the aircraft was parked at a terminal gate.

The benefits of the invention may best be appreciated using an example. Take the example of a fictitious flight, Delta Flight Number 123, a Boeing 727-200 leaving New York LaGuardia airport at 8:00 p.m. on October 10 and arriving in Atlanta at 10:30 p.m. In general, a short haul flight such as this will not provide a feature film to passengers. Thus, any content in the received data feed identified or tagged as a feature film will be discarded. Similarly, foreign language content will likewise be discarded based on the anticipated demographics of the passengers. In contrast, content identified as a Delta Airlines promotional segment will be routed to an appropriate storage location in the media file server. Similarly, content identified as passenger safety information for a Boeing 727-200 will similarly be stored. Such content may be identified based on aircraft type or tail number.

The system controller (222) will also passively interface with the aircraft's navigational system to obtain inputs that may be used to form play-out schedules. For example, play-out of content may be based on the location of the plane, the amount of time remaining in the flight or other real time data provided to the controller, such as time of day.

A particularly valuable benefit of the present invention is the ability to provide targeted and destination-specific advertising to passengers. For example, the controller may select an advertisement for a Delta SkyMiles hotel or rental car partner on the assumption that the passengers are SkyMiles members. In addition, advertising content may be identified based on the destination of the aircraft, so that the system controller (222) may select to play out advertisements for attractions, restaurants, hotels, and other businesses in the Atlanta area, Finally, on aircraft with "zoned" IFE, i.e., IFE (221) that can provided different content to different cabin classes, the system may interface with the IFE (221) in such a way so as to provide different entertainment and/or advertising content to first v. coach class passengers.

In an alternate embodiment of the invention, the operations centers (42 & 43) may be programmed with calendars of special events that are also used to target content and advertisements. For example, a Star Trek convention may be starting the next day in Atlanta. The operations center (42 & 43) may then insert elements of Star Trek television programming addressed to the aircraft based on, for example, flight number. In addition, advertising content, obtained either from the real-time data feed or on-board server, for a merchandiser of Star Trek memorabilia may also be selected for play-out by the on-board controller. Atlanta-based news may also be included in the play-out feed delivered to the IFE. The presence of the on-board system controller (222) permits the value of the media content provided to passengers to be maximized both from the passenger and advertiser perspective. The controller may re-order and re-schedule the real-time content received via satellite. For example, content may be tagged to be played out on the aircraft only during certain times of the day. If this content is received during a time when it is not to be played out, the controller (222) will route it to storage in the server (220), and select alternate content from the server (220) for play-out. Indeed, those of skill in the art of digital broadcast systems will recognize the myriad possibilities for customizing play-out schedules for individual flights.

Figure 5:
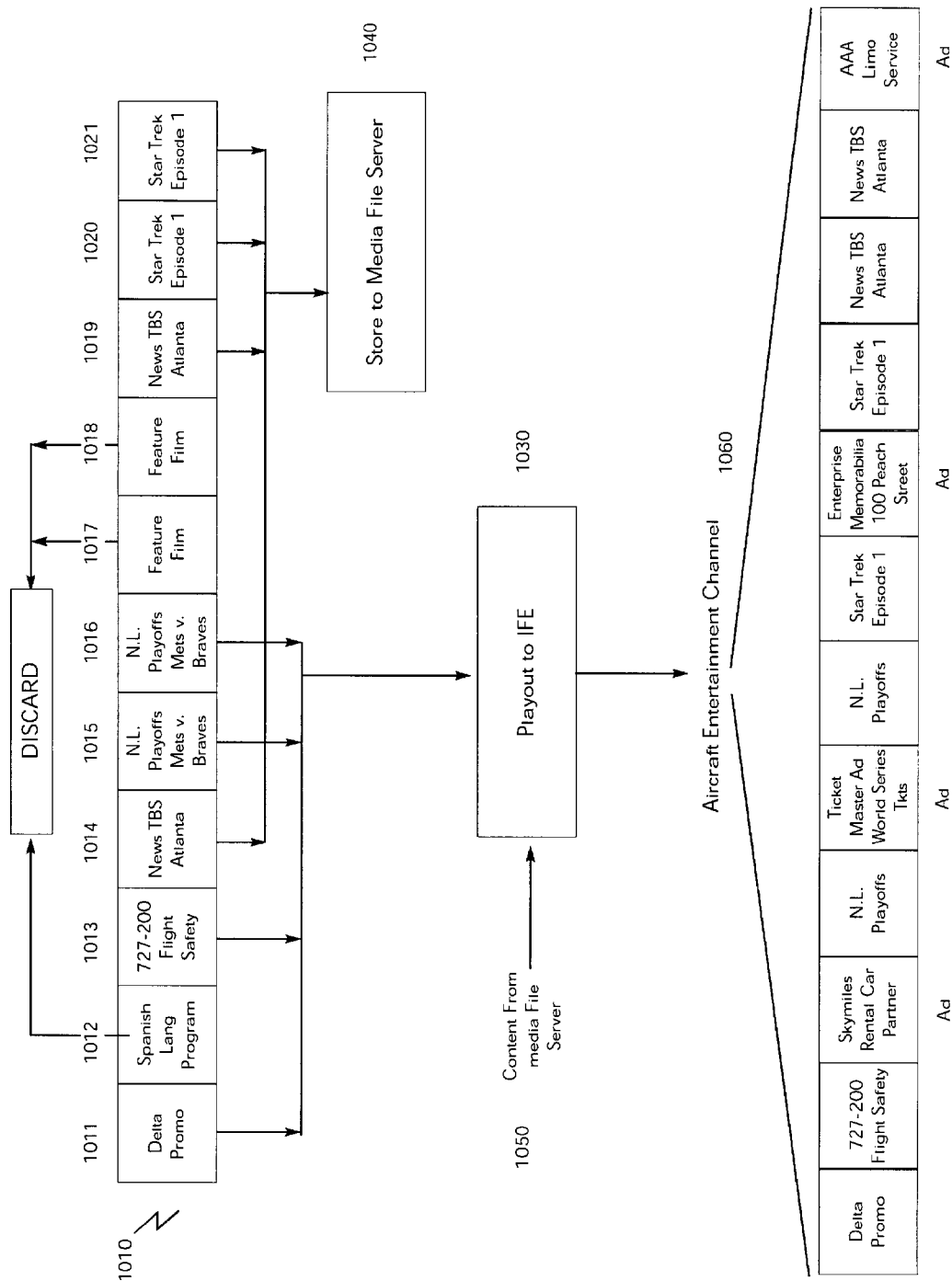
FIG. 5 shows an exemplary data stream received by an aircraft, and the data stream that is actually played out on-board the aircraft in accordance with an embodiment of the invention.

FIG. 5 illustrates the above example and shows how the controller (222) on the aircraft itself will generate the final playout schedule that dictates the content actually provided to the IFE (221). The received data feed (1010) includes 11 segments (1011–1021) which for illustrative purposes are shown of equal duration but may vary in duration. The feed (1010) includes elements and stream multiplexed together. The first segment is the promotional clip for Delta Airlines (1011), followed by a segment of Spanish language programming (1012). The third segment (1013) is the flight safety segment for the airplane, and the next three segments (1014–1016) are streams, one of news from TBS in Atlanta (1014), and two segments of the in progress National League playoff game between the New York Mets and Atlanta Braves (1015–1016). Segments (1017–1018) are for a feature film. Segment (1019) is another stream of TBS news, and the last two segments (1020–1021) are elements for a Star Trek episode.

As illustrated in FIG. 5, segments (1012, 1017, and 1018) are discarded because they will not be either played in real time or stored. Certain segments are stored to the media file server at (1040) for possible later playout, while others are routed to the IFE for playout (1030) in real time. Note that content from the media server (1050) is multiplexed with the real time content for playout. (1060) illustrates the actual content of the aircraft channel. As shown, targeted and destination-specific ads as have been inserted by the controller (222) at specific locations in the schedule. A particularly novel aspect of the present invention is the highly customized and targeted content streams that are provided to passengers as a result of the distribution and access control information that is used both to identify the transmitted content at the operations centers and control its playout on each member aircraft. For example, as shown in FIG. 5, an advertisement for World Series tickets may be inserted between baseball playoff game. Similarly an ad for a local merchant of Star Trek memorabilia may be inserted between Star Trek segments. Because of the much greater value to advertisers, the capabilities of the present invention allow for an economically viable advertiser-supported in-flight entertainment network that was heretofore unachievable.

The various components of the system may be implemented with off-the-shelf hardware or modified versions of existing components for digital broadcast systems to permit proper operation with existing aircraft IFE and other on-board systems. Those of skill in the art will readily recognize how to select and size the specific processors, servers, storage devices and other components based on overall system design parameters.

Figure 6:
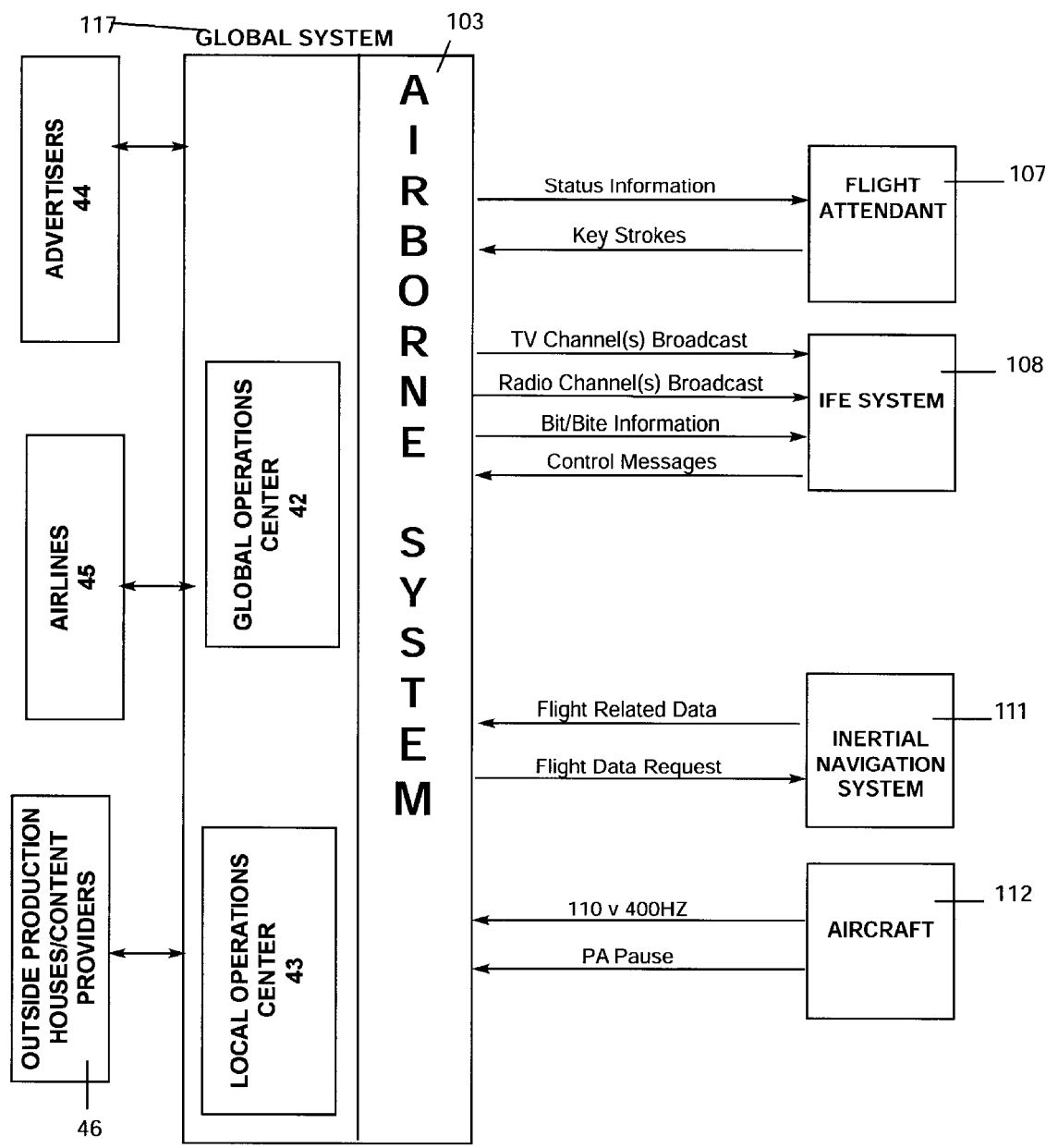
FIG. 6 is an overview of the components of the system of FIG. 1, illustrating the various inputs and outputs and interfaces to external systems and content providers.

FIG. 6 is an overview of one example of how information is exchanged among the various components of the system. FIG. 6 illustrates interfaces with advertisers, airlines, outside production houses and content providers and the various inputs and outputs of each and how this information supports the configuration management and distribution process that maintains and configures content that flows to the in-flight network. The global operations center (42), the local operations center (43) and the airborne system (103) at various levels interface with advertisers (44), airlines (45) and outside production houses/content providers (46). The Advertisers (44) support the system by providing payments for ads, reservations for ad slots, and providing various ad content that is to be incorporated into data elements for the airborne system (103) in-flight entertainment system (108). The In-flight network requests of advertisers (44) available ad slots, provides reconciliation reports of data as-run and bills advertisers for airtime. Also, shown are interfaces with a flight attendant (107) for system control (102), aircraft navigational system (111) and aircraft power and public announcement systems (112).

Figure 7:
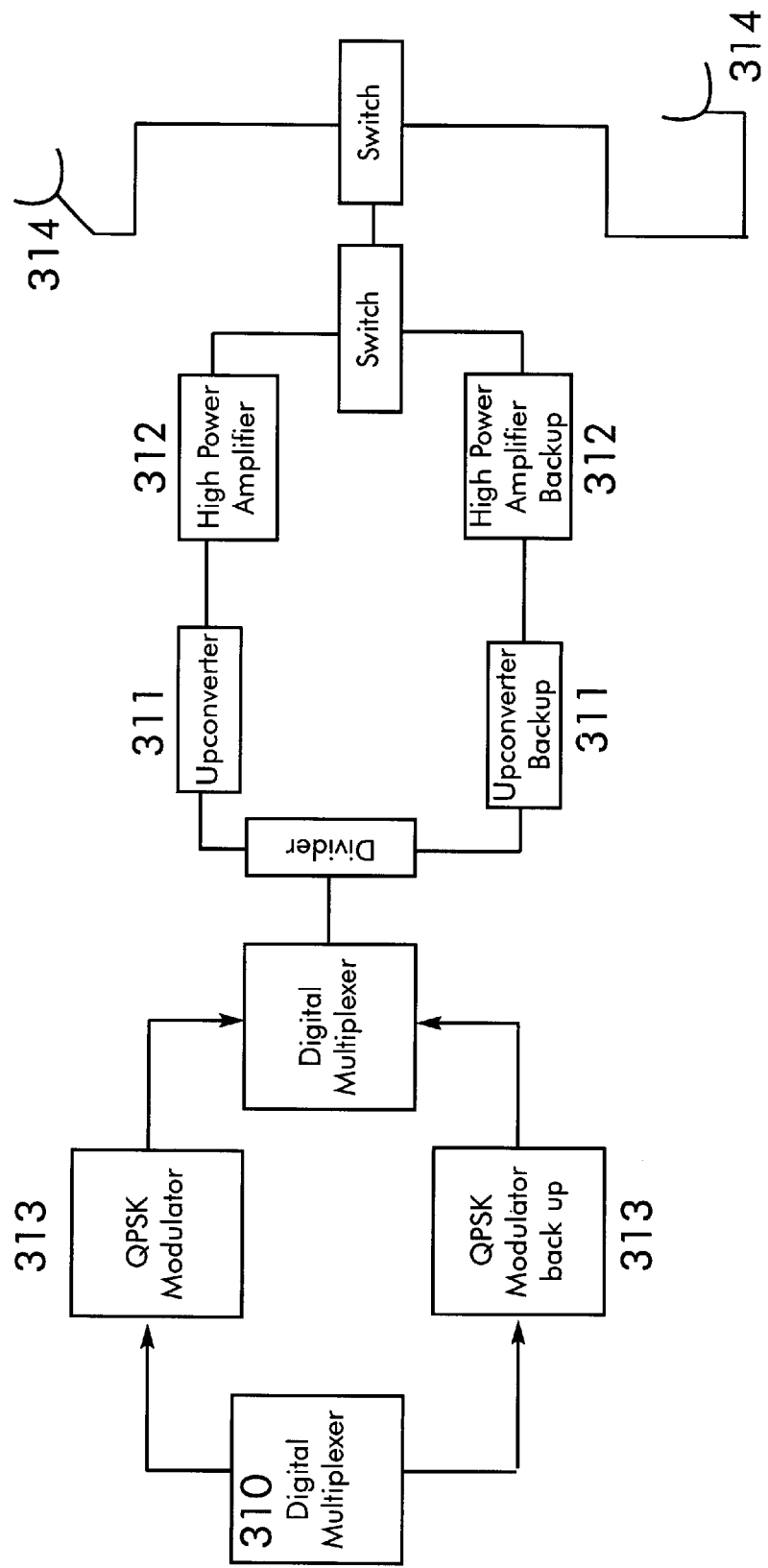
FIG. 7 shows how the resulting data stream generated at an operations center is up-linked to an antenna in an embodiment of a typical ground station up-link configuration.

FIG. 7 shows an example of how the resulting data stream generated at an operations center is up-linked to antenna in a typical ground station up-link configuration with redundancy for back-up in the event of failure. The data feed is formed by multiplexer (310) and routed to QPSK modulator (313), QPSK modulator back-up (313b), up-converter (311), up-converter back-up (311b), amplifier (312) and amplifier back-up (312b) and finally transmitted to up-link antennae (314), a benefit of this architecture is that in the event of failure at the primary ground station that controls multiplexing, modulation or RF components, redundant backup units may be put on line with only an instantaneous interruption. For interruptions caused by bad weather, the onboard aircraft system will automatically begin seamless play-out of locally stored material. Local playout can be used indefinitely if required, but return to normal operation when reception of the satellite signal occurs. Should the satellite fail, the same scenario would arise. Should unforeseen failures of the ground station occur, the up-link signal can be originated from other facilities.

The present invention provides the necessary infrastructure to offer an economically-viable, advertiser supported broadcast network for commercial passenger aircraft. The invention allows for unprecedented control over the content that is presented to passenger audiences, with virtually limitless capability to target content—and advertising—based on the needs and requirements of advertisers and content providers. Prior systems, although addressing technical issues in connection with, for example, distributing television signals to aircraft in flight, failed to address the need to provide a business model for an economically-viable in-flight entertainment service that capitalizes on the captive audiences provided by airline flights. Through the use of targeted and destination specific advertising, the present invention provides such a model by vastly increasing the value of in flight entertainment services to both advertisers and passengers.

The present invention is not limited in application to aircraft and not even necessarily to moving vehicles. For example, boats may similarly be equipped with the necessary hardware and software to operate as additional nodes in the disclosed broadcast network. In addition, in one embodiment of the invention, airlines that participate in the service may provide access to broadcast network content not just on its aircraft but also in terminal lounges that similarly operate as additional nodes in the network that may be provided with content in the same manner as member aircraft but without the requirement to use satellite antenna-based reception of content.

The present invention thus provides a virtual "cable head-end in the sky" given its versatility and the control placed on board each aircraft to determine the make-up of that aircraft's channel schedule and advertisements. It is to be understood that the described embodiments are merely illustrative of some of the many specific embodiments that represent applications of the principles of the present invention. As those of ordinary skill in the art will appreciate, numerous and varied other arrangements may be readily devised without departing from the scope of the invention.

We claim:

1. In an in-flight system for providing live television signals and other data content to passengers on a plurality of aircraft comprising one or more sources of television and other data content, a satellite delivery system for transmitting content to aircraft while in flight, an aircraft-based receiver system for receiving the transmitted content, and an aircraft-based delivery system for delivering the received content to passengers, the improvement comprising:

a content management and distribution system for formatting, scheduling and distribution of content to said plurality of aircraft, wherein a portion of said content includes live content, and wherein said content is scheduled in accordance with content distribution criteria including at least data corresponding to aircraft origin, and aircraft destination.

2. The improvement of claim 1 wherein said content management and distribution system formats, schedules, and distributes advertising segments with said content.

3. The improvement of claim 1 wherein said content management and distribution system formats said content in segments comprising elements and streams of content.

4. The improvement of claim 1 wherein said content comprises a combination of live television and pre-recorded content.

5. The improvement of claim 1 wherein said content management and distribution system addresses said packetized content in accordance with said distribution criteria.

6. A method for providing media content to a plurality of aircraft comprising the steps of:

receiving content from a plurality of content providers; said content comprising live television content and other content;

accessing content distribution criteria including flight destination and flight origin, used to distribute said content to a plurality of aircraft, said aircraft comprising aircraft in flight and grounded aircraft;

using said content distribution criteria to form a schedule defining the sequence and timing for transmission of selected, digitized portions of said content; wherein said digitized portions are identified in accordance with one or more of said content distribution criteria;

forming a data feed comprising said selected portions of content and sequenced in accordance with said schedule; and causing said data feed to be transmitted to said plurality of aircraft using one or more satellite up-link facilities.

7. The method of claim 6 further comprising the step of transmitting said data feed to one or more of said plurality of aircraft while said aircraft are stationary.

8. The method of claim 6 further comprising the step of inserting advertising slots in said data feed.

9. The method of claim 6 further comprising the forming of channel schedules for controlling play out of said content on one or more of said plurality of aircraft and transmitting said channel schedules to said one or more of said plurality of aircraft.

10. A method for providing media content to aircraft passengers comprising the steps of:

receiving on board an aircraft via satellite up-link digitized data scheduled by a content management and distribution system based on content distribution criteria including at least data corresponding to both flight destination and flight origin, comprising live television content, said digitized data comprising information identifying said content;

accessing said identifying information in said received digitized data;

accessing on board said aircraft one or more on-board content distribution criteria corresponding to one or more flight parameters used to control the disposition of said received digitized data;

using said identifying information and said one or more on-board content distribution criteria to determine whether portions of said received digitized data are discarded, stored for subsequent play out to passengers, or played out to passengers substantially upon receipt.

11. The method of claim 10 further comprising receiving a channel schedule to control play out of said content to the passengers.

12. A digital broadcast network for distribution of television and other media content to aircraft comprising:

one or more operations centers adapted to process live television content and schedule content based on content distribution criteria including at least data corresponding to both flight destination and flight origin, to form a digital broadcast feed, said operations centers coupled to a ground-based communications network;

one or more satellite up-link facilities, geographically spaced from each other and coupled to said operations centers;

a plurality of aircraft satellite antenna systems disposed on a corresponding plurality of aircraft and coupled to said satellite up-link facilities via one or more communications satellites; and a plurality of aircraft content storage and distribution systems, each of said storage and distribution systems coupled to a corresponding satellite antenna system and one or more in-flight entertainment systems on board said aircraft;

wherein said operations center is adapted to incorporate information into said digital broadcast data feed information used by said plurality of aircraft content storage and distribution systems to control distribution of said content to said in-flight entertainment systems.

13. The system of claim 12 wherein said airborne content storage and distribution systems access on-board information in-flight and use said on-board information to provide a playout schedule for playout of said content to said in-flight entertainment systems.

14. A method for providing an advertiser-supported, in-flight entertainment service comprising the steps of:

acquiring entertainment content from one or more content providers, wherein a portion of said entertainment includes live entertainment;

providing said content in digitized form to a plurality of member aircraft participating in said service;

acquiring advertising content from one or more advertisers for said service and providing said advertising content to said member aircraft;

forming a content play out schedule for scheduling the playout of said entertainment and advertising content to passengers on board said member aircraft;

wherein one or more portions of said advertising content are selected for insertion into said play out schedule on board said aircraft in accordance with both the destination of and origin of each of said aircraft.

15. The method of claim 14 wherein additional portions of said advertising content are selected for insertion into said play out schedule dependent upon the entertainment content adjacent to which said additional portions are inserted.

16. The method of claim 14 wherein additional portions of said advertising content are selected for insertion into said play out schedule dependent upon the demographics of said passengers.

17. The method of claim 14 wherein additional portions of said advertising content are selected for insertion into said play out schedule dependent upon the time of year.

18. The method of claim 14 wherein additional portions of said advertising content are selected for insertion into said play out schedule in accordance with a special event occurring at said destination point.

19. The method of claim 14 wherein additional portions of said advertising content are selected for insertion into said play out schedule in accordance with the cabin class for said play out schedule.

20. The improvement of claim 1, wherein access to said content is further based on access control criteria selected from the group consisting of airline, aircraft number, flight number, flight phase, cabin class, language, date, time of day, flight origin, flight destination, passenger demographics, special events, scheduled departure and arrival times, season local time, and flight duration.

21. The improvement of claim 20, wherein said access control criteria are further based on zone access parameters wherein said zone access parameters include one or more parameters associated with controlling access to said content at various zones of said aircraft.

22. The improvement of claim 21, wherein said access control criteria are further based on server access parameters wherein said server access parameters include one or more parameters associated with controlling access to said content at one or more on-board servers.

23. The improvement of claim 22, wherein said access control criteria are further based on smart card access parameters wherein said smart card access parameters include one or more parameters associated with controlling access to said content by one or more individual passengers on-board said aircraft.

24. The improvement of claim 1, wherein said system further includes a ground-based network for transmitting said content to a plurality of distribution points.

25. The improvement of claim 1, wherein said content is encrypted.

26. The improvement of claim 1, wherein said content is multiplexed into a data stream and transmitted to said plurality of aircraft.

27. The improvement of claim 2, wherein said advertising segments are targeted and distributed based on destination.

28. The improvement of claim 2, wherein said advertising segments are targeted and distributed based on content.

29. The improvement of claim 2, wherein said advertising segments are targeted and distributed based on passenger demographics.

30. The improvement of claim 2, wherein said advertising segments are targeted and distributed based on cabin class.

31. The improvement of claim 3, wherein said elements comprise pre-recorded content and said streams comprise live content.

32. The improvement of claim 4, wherein said live television content is multiplexed with said pre-recorded content.

33. The improvement of claim 4, wherein said pre-recorded content is transmitted through wireless transmission while said aircraft is stationed on the ground at the airport terminal.

34. The method of claim 6, wherein said content distribution criteria is selected from the group consisting of airline, aircraft number, flight number, flight phase, cabin class, language, date, time of day, flight origin, flight destination, passenger demographics, special events, scheduled departure and arrival times, season local time, and flight duration.

35. The method of claim 6, wherein said data feed is transmitted in elements and streams.

36. The method of claim 35, wherein said elements comprise pre-recorded content and said streams comprise live content.

37. The method of claim 6, further comprising receiving performance data from said aircraft, wherein said performance data comprises codes that reveal errors in transmission of said data feed and failed receipt of said data feed.

38. The method of claim 6, wherein said data feed is transmitted to said plurality of aircraft while in-flight.

39. The method of claim 6, further comprising receiving said data feeds on said plurality of aircraft and dispensing said data feeds based on said content distribution criteria.

40. The method of claim 6, wherein said data feed includes advertising content that is targeted and destination specific.

41. The method of claim 9, wherein said play-out of said content may be revised based on immediate data selected from the group consisting of delays in take-off, changes in routing, delays in landing, weather conditions, maintenance problems, cancellations, and changes in overall flight time.

42. The method of claim 7, wherein said transmitting of said data feed occurs while said plurality of aircraft are parked at a plurality of terminal gates.

43. The method of claim 8, further comprising transmitting playout reports to a plurality of advertisers.

44. The method of claim 43, wherein said playout reports reconcile pre-scheduled advertisement with actual advertisement play-outs.

45. The method of claim 9, wherein said channel schedules are further tailored by data obtained and processed while on-board said plurality of aircraft.

46. The method of claim 45, wherein said data includes local departure and arrival times of the flight.

47. The method of claim 46, wherein said data is selected from the group consisting of delays in take-off, changes in routing, delays in landing, weather conditions, maintenance problems, cancellations, and change in overall flight time.

48. The method of claim 10, wherein said content distribution criteria further include content type and language.

49. The method of claim 10, further comprising forming channel schedules to control playout of said content while on-board said aircraft.

50. The method of claim 49, wherein said channel schedules are formed by receiving aircraft-specific data while said aircraft are in-flight.

51. The method of claim 10, further comprising the step of decrypting encrypted data.

52. The method of claim 10, further comprising the step of selecting and inserting advertising content from advertisements that are pre-recorded and stored on-board said aircraft.

53. The method of claim 52, wherein said advertisements are selected and based on destination of said aircraft.

54. The method of claim 53, wherein said advertisements are selected and based on passenger demographics.

55. The method of claim 10, further comprising the step of buffering said content before playout of said content to test if said content was properly received.

56. The method of claim 10, further comprising the step of substituting live content with stored content in the event of loss of signal.

57. The method of claim 10, further comprising verification of receipt in complete form of said received data prior to storage or play out to passengers of said received data.

58. The method of claim 57, further comprising replacing certain said received content with certain stored content and categorizing said received in order to provide seamless play-out of said received content.

59. The method of claim 10, wherein said content distribution criteria are selected from the group consisting of aircraft number, flight number, flight phase, airline, cabin class, language, date, time of day and passenger demographics.

60. The method of claim 58, further comprising play-out of pre-recorded content instead of said categorized received content when live satellite reception is interrupted to provide seamless play-out of said content.

61. The method of claim 11, further comprising modifying received said channel schedules based on received flight-specific data.

62. The method of claim 61, further comprising forming multiple playout schedules.

63. The digital broadcast network of claim 12, wherein said ground-based communications network comprises a public switched telephone network (PSTN).

64. The digital broadcast network of claim 12, further comprising a communication channel for providing data from said aircraft to said operations center.

65. The digital broadcast network of claim 64, wherein said communication channel serves to notify said operations center of partial receipt of said content and errors with said content.

66. The digital broadcast network of claim 64, wherein said communications channel serves to provide playout reports reconciling pre-scheduled playout of advertisements with actual playout of advertisements.

67. The digital broadcast network of claim 12, wherein said ground-based communications network comprises Internet access.

68. The digital broadcast network of claim 12, further comprising links for transmitting said content while said aircraft are ground-based.

69. The digital broadcast network of claim 12, wherein said incorporated information identifies a type of said content.

70. The digital broadcast network of claim 12, further comprising an advertising manager for selling available advertisement slots to a plurality of advertisers.

71. The digital broadcast network of claim 70, wherein said advertising manager reports back playout of advertisements to said plurality of advertisers.

72. The system of claim 12, wherein said network further comprises one or more back-channels wherein communications are transmitted from said operations centers to said plurality of aircraft.

73. The system of claim 12, wherein said network includes ground-based back-channels that are located at a plurality of airport terminals.

74. The system of claim 73, wherein said back channels exist at a first point of access by an individual passenger of said plurality of aircraft in said system.

75. The system of claim 74, wherein said back channel provides connectivity to said individual passenger from said aircraft's entertainment system.

76. The system of claim 74, wherein said back channel provides connectivity to said individual passenger from said passenger's personal computer.

77. The system of claim 72, wherein said communications further includes performance data of on-board system operations.

78. The system of claim 77, wherein said performance data allows for corrective action selected from the group consisting of re-transmitting a failed signal, auditing of content play-out, reconciliation of as-run advertisements and other data that is used to administer content delivery to aircraft.

79. The system of claim 13, wherein said operation centers elect content for particular geographic regions they serve based on various factors selected from the group consisting of customer feedback, demographics and airline requirements.

* * * * *